Jan. 5, 1926. 1,568,415
F. L. PILLIOD
NONHEAT CONDUCTING COVERING
Filed August 9, 1924
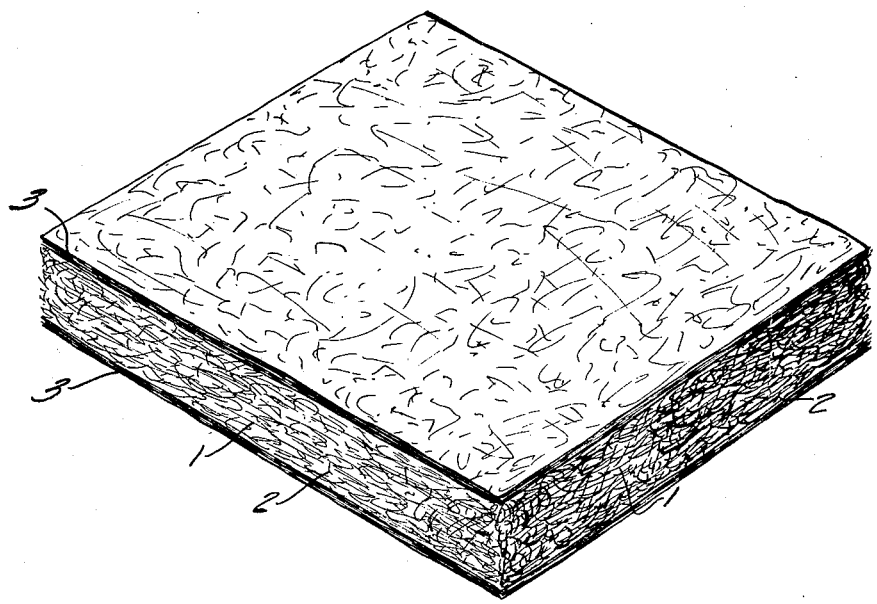
INVENTOR
Frederic L. Pilliod
BY
ATTORNEY Patented Jan. 5, 1926.

1,568,415

UNITED STATES PATENT OFFICE.

FREDERIC L. PILLIOD, OF PLAINFIELD, NEW JERSEY, ASSIGNOR TO JOHNS-MANVILLE INCORPORATED, A CORPORATION OF NEW YORK.

NON-HEAT-CONDUCTING COVERING.

Application filed August 9, 1924. Serial No. 731,198.

*To all whom it may concern:*

Be it known that I, FREDERIC L. PILLIOD, a citizen of the United States of America, residing at Plainfield, Union County, State of New Jersey, have invented certain new and useful Improvements in Non-Heat-Conducting Coverings, of which the following is a specification.

My invention relates to that type of covering for pipes, boilers and other containers of heated materials, as well as for other structures where transmission of heat is to be prevented, which coverings are often formed of fibrous materials assembled in more or less fluffy masses which contain a multiplicity of substantially closed air cells, and my invention is based on the discovery that a particular type of mineral fibre, heretofore considered practically worthless, has certain characteristics which give new and advantageous qualities to non-heat conducting coverings made out of it, and develop in said coverings other desirable qualities to a higher degree than has been the case with materials previously used for this purpose.

The material in question is amosite, sometimes called brown African asbestos. It occurs in large areas at or near the surface of the ground in certain portions of South Africa in the form of fine, long, hard, straight needles or fibres of a dark mineral compound which, on analysis, I have found to contain in every 200 parts by weight, about 177 parts of silicate of iron ($FeSiO_3$), 14 parts of magnesium silicate ($MgSiO_3$), 8 parts aluminum silicate ($Al_2(SiO_3)_3$), and about 1 part of a residue of impurities, mainly calcium or calcium silicate. As taken from the earth these needles or fibres are sometimes 12 to 15 inches long, but for ease in handling they are usually chopped up into lengths of from 4 to 6 inches.

These fibres are much stronger, harder and tougher than ordinary mineral fibre, such as common asbestos and are fairly flexible. Individual fibres have a specific gravity of 3.345 as compared with that of 2.419 for ordinary asbestos, but on account of their stiffness and hardness the space occupied by a given weight of felted amosite fibre is about twice that occupied by the same weight of ordinary asbestos fibre. Amosite is also highly resistant to acids, as is the case with many silicates, and practically non-absorbent of water or other liquids. It contains only about one per cent of water of crystallization, while ordinary asbestos contains about ten times that amount.

I have also found that the needles or fibres of amosite have a certain roughness of exterior which causes them to easily felt together, and to exert such felting action to a very high degree with softer mineral fibres, such as short chrysotile asbestos fibre, or crushed serpentine rock, when the amosite is mixed with these softer fibres in a felting operation.

If amosite is formed into a felted mass, preferably with a small amount of liquid silicate of soda serving as a cement to cause still more secure adhesion of the fibres, a product is obtained which is extremely light in weight and a most efficient heat insulator at temperatures below 500 degrees Fahrenheit. It is practically resistant to acids or acid fumes and will not absorb water, oil or other liquids. Consequently it maintains its porous, or original multiple-air-cell structure under conditions where ordinary mineral fibre coverings will break down, or pack into solid masses of low heat insulating efficiency.

Such a felted mass composed entirely of amosite is, however, so highly porous that when subjected to very high temperatures the heated air in its interior travels so freely through its pores that its insulating efficiency drops sharply, and for high temperature use I mix a quantity of short fibred asbestos with the long fibred amosite before forming the felt therefrom. For ordinary high temperature uses I mix equal weights of the amosite and the asbestos. The fibres are usually held together by impregnating the mass with a small quantity of liquid silicate of soda (commonly known as water glass) and allowing the same to dry or set. The resultant felt is, of course, not so light as the pure amosite felt but it is still much lighter than the ordinary asbestos felt and proves to be a high temperature heat insulator of much higher efficiency than any now on the market, and one which is sufficiently tough, non-absorbent of liquids and immune from attack by acids for all practical purposes.

The accompanying drawing is a perspective view of a small sheet or slab of compound amosite and asbestos felt embodying my present invention.

1, 1, represent the long amosite needles or fibres, 2, 2, the short asbestos fibre felted in with the amosite, and 3, 3, are shells or surface layers of harder character formed by localizing at the surfaces of the sheet a surplus of silicate of soda either by dipping the completed felt in a bath of silicate of soda, or by painting or sprinkling the liquid silicate of soda on the surfaces of the felt.

When special shapes are required the felt may be built up in the desired shape, or formed in a sheet or block and molded or bent to the desired shape, after which the necessary additional rigidity is produced by an exterior shell containing an excess of silicate of soda formed by dipping, sprinkling or painting as above described.

The felting operation may be performed by hand, building up a block or sheet by spreading layers of the fibre in a mold, one on another, sprinkling liquid silicate of soda (water glass) on each layer, pressing the mass together and allowing the silicate of soda to set, or this work may be done on any ordinary felt forming machine.

Among the advantages of heat insulating covering produced according to my invention may be mentioned the following: It has a heat insulating efficiency about double that of most other mineral fibre coverings. Having practically no water of crystallization nor $CO_2$ constituent to be driven off by heat, it retains its integrity and original form at temperatures of 1000 degrees Fahrenheit while temperatures above that will reduce ordinary asbestos or magnesia pipe covering to calcined dust. If the intermixture of short ordinary asbestos or equivalent mineral filling is used as above described, the resultant mass also retains its high heat insulating efficiency at these temperatures. Being tough and strong and retaining that strength during use and exposure to heat, it may be cut and pulled off from an old covering to permit repairs to a pipe or boiler to which it has been applied, and afterwards put back to reform a covering as good as new. It can be obtained in practically unlimited quantities at substantially the cost of transportation and handling plus operating profit, as no mining nor pit digging operations are necessary, because it lies at the surface of the ground and can be shoveled into cars from its native bed. Further economy results from the fluffy character of the felt formed from it which means that to produce a covering of any desired thickness there is consumed only about half the weight of fibre which would be required if ordinary asbestos were used. Also but little silicate of soda is absorbed by it in the felting operation, and if the amount of silicate of soda required for felting the same volume of ordinary asbestos felt is poured over the amosite, a large per cent of it will filter through and can be used over again, or only a small proportion of the usual amount need be used originally. These advantages may be mentioned in addition to the power to withstand moisture, acids and deforming blows or stresses, previously referred to. As at present advised it is my belief that many of the above characteristics of the described covering, resulting from the strength, stiffness, hardness and non-absorbent qualities of the fibre are due to the fact that the amosite is composed of a mixture of practically pure silicates, as shown by the foregoing analysis.

Having described my invention, I claim:

1. As a new article of manufacture a non-heat-conducting covering comprising a felted mass of long fibres of amosite interspersed with short fibres of ordinary asbestos.

2. As a new article of manufacture a non-heat-conducting covering comprising a felted mass of long fibres of amosite interspersed with short fibres of ordinary asbestos, said mass being impregnated with silicate of soda.

3. As a new article of manufacture a non-heat-conducting covering comprising a felted mass of long fibres of amosite interspersed with about an equal weight of short fibres of ordinary asbestos.

4. As a new article of manufacture a non-heat-conducting covering comprising a felted mass of long fibres of amosite interspersed with about an equal weight of short fibres of ordinary asbestos, said mass being impregnated with silicate of soda.

FREDERIC L. PILLIOD.